UNITED STATES PATENT OFFICE.

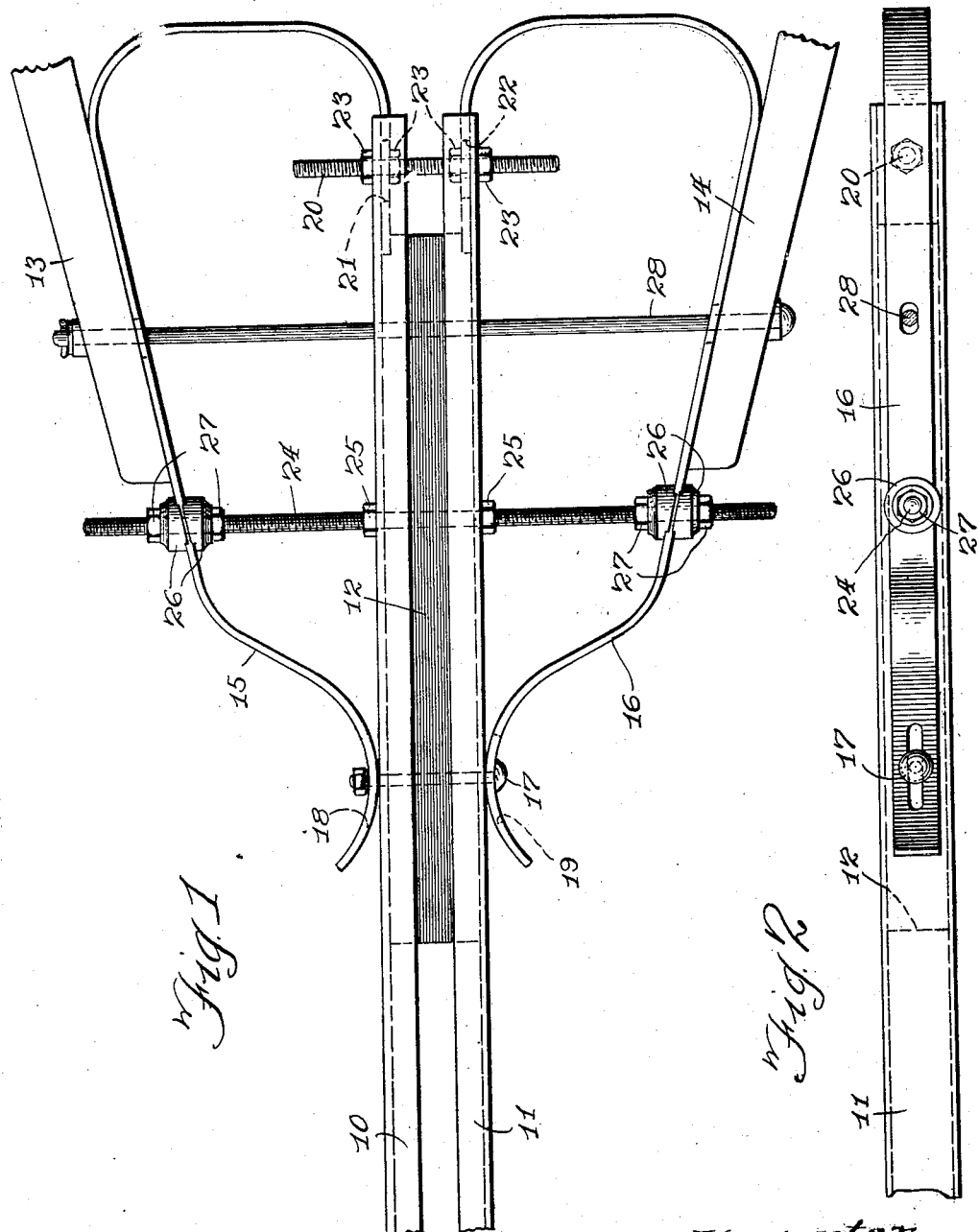

MARTIN E. ANDERSON, OF DE KALB, ILLINOIS, ASSIGNOR OF ONE-THIRD TO HIMSELF, ONE-THIRD TO FRANK G. ANDERSON, AND ONE-THIRD TO ANDREW O. ANDERSON, BOTH OF DE KALB, ILLINOIS.

VEHICLE-TONGUE.

1,265,868.

Specification of Letters Patent.

Patented May 14, 1918.

Application filed August 24, 1916. Serial No. 116,621.

*To all whom it may concern:*

Be it known that I, MARTIN E. ANDERSON, a citizen of the United States, and a resident of De Kalb, in the county of De Kalb, State of Illinois, have invented certain new and useful Improvements in Vehicle-Tongues, of which the following is a specification, reference being had to the accompanying drawing.

My invention relates to tongues for vehicles and it has for its principal object the provision of new and improved means for attaching a tongue to a vehicle. It is one of the objects of my invention to provide attaching means of this type which are readily adjustable to suit various widths and angles of hounds. It is another object of my invention to improve devices of this type in sundry details hereinafter pointed out. The preferred means by which I have accomplished my several objects are illustrated in the drawings and are hereinafter specifically described. That which I believe to be new and desire to cover by this application is set forth in the claims.

In the drawings:—

Figure 1 is a top view of the rear end of a tongue illustrating the means of attachment to the hounds of a vehicle; and Fig. 2 is a side view of the parts shown in Fig. 1, but with one of the hounds removed.

Referring to the several figures of the drawings in which corresponding parts are indicated by the same reference characters,—

10—11 indicate channel-irons spaced apart at their rear ends by a spacing-block 12, forming together a pole or tongue for a vehicle, the forwardly-projecting hounds 13 and 14 of which are shown. The tongue comprising the channel-irons 10—11 is secured to the hounds 13—14 by means of heavy straps of steel 15—16 so connected with the tongue as to be adjustable relative thereto for changing the angle of the outer portions thereof which lie adjacent to the hounds 13—14. The straps 15—16 are adjustably connected near their forward ends to the channel-irons 10—11 by means of a bolt 17 passing through the tongue and through slots 18—19 in said straps, whereby the forward ends of said straps are adjustable backward and forward relative to the channel-irons. The forwardly-turned rear ends of the straps 15—16 are connected to the rear ends of the channel-irons 10—11 by means of a screw-threaded pin 20 passing through the channel-irons and through slots 21—22 in the straps 15—16 respectively, whereby the rear ends of the straps are adjustable forward and backward relative to the channel-irons, the rear ends of the straps being adapted to be held rigidly in position relative to the channel-irons by means of nuts 23 mounted upon the screw-threaded pin 20.

A screw-threaded pin or rod 24 passes through the channel-irons 10—12 and the spacing block 12 intermediate the front and rear ends of the straps 15—16, being held in position relative to the channel-irons by means of nuts 25. Oppositely-notched clips 26 mounted upon the screw-threaded pin 24 in position to embrace the straps 15—16 are held in adjusted position along such screw-threaded rod by means of nuts 27. The tongue as a whole is secured to the hounds 13—14 by means of a horizontally-extending pivot pin 28 passing through the said hounds, through the straps 16—15, and through the channel-irons 10—11 near their rear ends.

By making the straps 15—16 of heavy material adapted to be sprung slightly relative to the channel-irons 10—11, I have provided a construction by which the portions of the straps which engage the hounds 13—14 may be adjusted relative to such hounds so as to have a proper working fit regardless of slight variations in the distance between such hounds and regardless of slight variations in the angle of one hound relative to the other. As will be readily understood, by loosening the nuts on the screw-threaded pins or bolts 17, 20 and 24, the straps 15—16 can be shifted backward or forward relative to the channel-irons 10—11 and relative to the pivot pin 28, and the forward ends of the bearing portions of the straps can be spread apart or compressed relative to each other by a proper adjustment of the nuts 27 upon the rod 24 for bringing about the desired adjustment of the straps. A tightening of the several clamping means thereupon serves to hold the straps in proper condition.

What I claim as my invention and desire to secure by Letters Patent, is—

1. The combination of a tongue, and means for attaching said tongue to the hounds of a vehicle, comprising attaching members secured to opposite sides of the tongue having flexible outer bearing portions in the form of metal straps adapted to bear against the hounds of the vehicle, a screw-threaded rod secured to said tongue and extending transversely to said straps, oppositely-notched clips upon opposite end portions of said rod embracing said straps, and nuts upon said rod for clamping said clips in the desired adjusted position upon said straps.

2. The combination of a tongue, and means for attaching said tongue to the hounds of a vehicle, said means comprising resilient metal straps secured at the end portions to opposite sides of the tongue and movable longitudinally thereof and having their intermediate portions bowed outwardly to yieldingly bear against the hounds, a rod projecting from opposite sides of the tongue, and means adjustable on said rod for engaging said straps.

3. The combination of a tongue, and means for attaching said tongue to the hounds of a vehicle, said means comprising resilient metal straps secured at their end portions to opposite sides of the tongue and movable longitudinally thereof and having their intermediate portions bowed outwardly to yieldingly bear against the hounds, means for slidingly connecting the said bowed portions to the hounds, a rod projecting laterally at each side of the tongue, and movable means on said rod for engaging said straps and holding them in adjusted positions with respect to said rod.

MARTIN E. ANDERSON.

Copies of this patent may be obtained for five cents each, by addressing the "Commissioner of Patents, Washington, D. C."